United States Patent [19]

Wilms et al.

[11] 4,321,143

[45] Mar. 23, 1982

[54] TREATING EFFLUENT WITH PEROXIDE AND IRON

[75] Inventors: Klaus G. Wilms, Dormagen; Helmut Waldmann, Leverkusen, both of Fed. Rep. of Germany

[73] Assignee: Bayer Aktiengesellschaft, Leverkusen, Fed. Rep. of Germany

[21] Appl. No.: 161,526

[22] Filed: Jun. 20, 1980

[30] Foreign Application Priority Data

Jul. 11, 1979 [DE] Fed. Rep. of Germany ....... 2927911

[51] Int. Cl.$^3$ ................................................ C02F 1/72
[52] U.S. Cl. .................................... 210/631; 210/721; 210/759
[58] Field of Search ................................ 210/626–628, 210/631, 721, 759, 763

[56] References Cited

U.S. PATENT DOCUMENTS 4,221,661  9/1980  Shimizu et al. ...................... 210/759

FOREIGN PATENT DOCUMENTS 2521893  11/1975  Fed. Rep. of Germany ...... 210/759
51-02252   1/1976  Japan .................................... 210/759
51-32057   3/1976  Japan .................................... 210/759
53-63760   6/1978  Japan .................................... 210/759

*Primary Examiner*—Benoit Castel
*Attorney, Agent, or Firm*—Sprung, Felfe, Horn, Lynch & Kramer

[57] ABSTRACT

In the process for decreasing the COD-content of effluent by treating with hydrogen peroxide in the presence of a transition metal compound, the improvement which comprises adding to the effluent about 50 to 65% of the calculated quantity of $H_2O_2$ required for the total oxidation of the total COD-content of the effluent, the transition metal compound being dissolved in the effluent in an amount such that the molar ratio of $H_2O_2$ to transition metal is from about 30:1 to 3:1, bringing the pH initially to about 2 to 9, maintaining the effluent at about 5° to 100° C., and separating from the effluent whatever material has flocculated. Thereafter the effluent can be subjected to conventional biological degradation such as by the activated sludge process.

3 Claims, No Drawings

TREATING EFFLUENT WITH PEROXIDE AND IRON

In some processes, effluent is produced which cannot be decomposed biologically using the conventional methods of activated sludge treatment, or the substances it contains often present problems in biological purification plants because the activated sludge cannot adapt fast enough to the different chemicals in the effluent. This applies particularly where there is a discontinuous yield of such effluent. Adaptation difficulties are also noticed with non-toxic substances in the effluent as a result of temporal and quantitative fluctuations of the resulting effluent.

A method is known of using hydrogen peroxide in the presence of transition metal compounds as an oxidation agent for the purification of effluent. Thus, the suggestion is made in Japanese Patent Application No. 51-132,057 of adding to the effluent hydrogen peroxide, in a quantity which is theoretically necessary for total oxidation, based on the COD-content of the effluent. However, using a quantity of hydrogen peroxide which is stoichiometrically equivalent to the COD-content of the effluent only results in decreasing the COD in the effluent and a residual content of COD remains, because the hydrogen peroxide which is used is not fully utilized for decreasing the COD.

In order to achieve an extensive COD-decrease, the quantity of hydrogen peroxide which is added can be increased. Thus for example, an addition of hydrogen peroxide is suggested in Japanese Patent Application No. 51-136,947 which is more than twice the amount theoretically required for total oxidation according to the COD-content of the effluent. This increase in the addition of hydrogen peroxide does indeed provide a possibility of decreasing the COD-content, but a residual content of COD always remains in the effluent and the hydrogen peroxide utilization in this case is less than 50%.

The suggestion is made in Japanese Application No. 53-063,760 of simultaneously introducing oxygen during the reaction of the effluent with hydrogen peroxide in the presence of transition metal compounds, as otherwise a decrease in the COD-content cannot be achieved.

However, in this suggested processes, the expensive hydrogen peroxide which is used can never be fully utilized; oxygen must also be introduced to some extent into the effluent to be treated, and operational disturbances occur in all cases in the subsequent effluent purification step according to the activated sludge process.

It has now been found in contrast to this that the COD-content of effluent can be decreased using hydrogen peroxide in the presence of transition metal compounds without disadvantage to a subsequent biological effluent-purification process, if the effluent is treated with a calculated amount of hydrogen peroxide less the quantity of $H_2O_2$ required for total oxidation of the total COD-content of the effluent.

The subject of the present invention is, therefore, a process for decreasing the COD-content of effluent by treating with hydrogen peroxide in the presence of transition metal compounds, which is characterized in that about 50 to 65% of the calculated quantity of $H_2O_2$ required for total oxidation of the total COD-content of the effluent is added to the effluent, a temperature of about 5° to 100° C. being maintained during the treatment a starting pH-value of approximately from 2 to approximately 9 being set in the effluent, and a quantity of water-soluble metal compounds such that the mole ratio of added $H_2O_2$ to the metal compounds in the effluent is approximately from 30:1 to approximately 3:1, being added to the effluent, and the flocculated material then being separated, optionally after the addition of basic substances.

By means of the present invention, biologically non-decomposable or only problematically decomposable substances contained in the effluent can surprisingly be converted into biologically-decomposable substances i.e. according to the treatment of the invention using hydrogen peroxide in the presence of transition metal compounds, the remaining COD-content of the effluent is biologically decomposable.

The COD-content in the resulting effluent is initially established by analytical means and the effluent can be treated either continuously or discontinuously. The effluent is then brought to a temperature of between from approximately 5° C. to approximately 100° C., preferably about 20° C. to 45° C., and most preferably about 25° to 34° C. The pH value of the effluent is adjusted to values of between from approximately 2 to approximately 9, preferably about 3.5 to 6.5, most particularly preferred being about 4 to 5.

The effluent is then treated with hydrogen peroxide in a quantity of from 50 to 65% of the quantity theoretically required for total oxidation of the COD-content. Preferably, about 55 to 63% of the calculated quantity of $H_2O_2$ is added, about 57 to 62% being particularly preferred. Surprisingly during this treatment, the added hydrogen peroxide is completely utilized in decreasing the COD-content, while with the stoichiometric or over-stoichiometric dosage of hydrogen peroxide, based on the COD-content, a large amount of the hydrogen peroxide does not contribute to the COD-decrease.

The hydrogen peroxide is decomposed using soluble or at least partially soluble transition metal compounds. For this purpose, copper, aluminum zinc and/or iron compounds are preferably used, iron compounds being most particularly preferred. At least partially soluble, as well as iron (II) and/or iron (III) compounds and also iron in its elemental form e.g. in the form of scrap iron, are used as iron compounds. Both oxidic as well as sulphidic ores, for example magnetite, hematite and limonite or pyrite can also be used as iron compounds. In many cases, iron (III) compounds, such as $Fe(OH)_3$, $Fe_2O_3$, $FeCl_3$ and/or $Fe_2(SO_4)_3$ are selected as the catalyst. Iron (II) compounds, such as $FeO$, $Fe(OH)_2$, $FeCl_2$, $FeCO_3$ are preferably used as catalysts and $FeSO_4 \cdot 7H_2O$ or so-called green salt from the preparation of titanium dioxide is most preferably used as a catalyst. When using elemental iron as the catalyst, the iron is preferably solubilized in an acidic effluent, so that the total effluent is prevented from becoming salified.

The molar ratio of hydrogen peroxide to iron is determined by the nature and concentration of the substances contained in the effluent, on the reaction temperature and the floccuation effect which is desired in the subsequent neutralization. Where there is an easily oxidizable effluent and a temperature range of, for example, from 20° C. to 35° C., the process is carried out with a molar ratio of hydrogen peroxide to iron of about 30:1 to 3:1, preferably about 20:1 to 10:1, the most particularly preferred ratio being about 18:1 to 13:1. With higher temperatures, smaller quantities of iron compounds are also sufficient, for example where there is the same effluent but with a temperature range of from 40° to 60° C., the process can be carried out with a molar ratio of hydrogen peroxide to iron of about 100:1 to 60:1. Where there are even higher temperatures, the molar ratio increases accordingly. In contrast to this however, substances contained in the effluent which complex iron compounds or are themselves difficult to oxidize under usual conditions, for example phosphates, phosphoric acid derivatives and N-heterocyclic compounds, require doses of iron in the molar ratio of hydrogen peroxide to iron of about 3:1 or lower.

The reaction can be carried out in the present invention under both isothermal as well as adiabatic conditions. According to the invention, the method is carried out in a temperature range of approximately from 5° C. to approximately 100° C., preferably approximately from 20° C. to approximately 45° C., and most particularly preferred at approximately 25° C. to approximately 35° C. In special cases, with isothermal as well as adiabatic reaction guidance, the stated temperature range can even be exceeded or dropped below, whereby under certain circumstances, the method can also be carried out under increased or decreased pressure.

After treating the effluent with hydrogen peroxide in the presence of transition metal compounds, preferably iron compounds, the treated effluent continues to be treated biologically or in exceptional cases, is treated in a different manner. The effluent is more or less acidic and must be adjusted accordingly to the pH-value which is necessary for the biological treatment. This partial step of the process of the invention is, therefore carried out using basically reacting substances, for example potassium hydroxide, sodium hydroxide, preferably, however, using calcium compounds, for example calcium oxide, calcium hydroxide and/or calcium carbonate, most preferably milk of lime. Here, the transition metal ions present in the effluent, e.g. the preferably added iron, are precipitated as hydroxides, thereby causing a flocculation adsorption. The substances which in rare cases have already been previously flocculated or are flocculated and precipitated during the addition of basic substances, are separated, preferably by filtration, sedimentation, flotation or centrifugation.

Surprisingly, using the measures of the invention, a COD-decrease of the effluent can be achieved which is higher than can be achieved as a result of the COD-decrease by means of a separate hydrogen peroxide treatment and flocculation adsorption. In other words, the treatment of effluent according to the invention using less than the stoichiometric quantity of hydrogen peroxide, based on the quantity for the theoretical complete oxidation of the total COD-content and the subsequent flocculation adsorption does not merely produce the sum total of the COD-decreases from the individual steps, but a much higher value.

Therefore, using the process of the invention, not only biologically decomposable products and a practically quantitative hydrogen peroxide utilization are obtained, but also a decrease of the COD-content in the effluent which is higher than calculated.

The process of the invention is now described in more detail with reference to the following examples:

EXAMPLE 1

Effluent from the production of letter-marked acids contained the following substances among others:
250—300 mg/l G-acid
400—500 mg/l H-acid
300—400 mg/l R-acid
150—200 mg/l Naphthol-1-sulphonic acid-4

The COD, $BOD_5$ and pH values of the effluent were:
COD: 1 490 mg/l
TOC: 495 mg/l
$BOD_5$: 270 mg/l
pH: 1.5

The noxious effect of this effluent in respect of *Pseudomonas fluorescens* was up to dilution of 1:17 and at 1:100 in respect of *Leuciscus idus*.

The effluent characterized above was subjected to the following chemical-biological treatment (proportions always being based on 1 l of effluent):
1. Addition of 1.05 g of $FeSO_4.7H_2O$
2. pH adjustment using milk of lime to pH value 4.5
3. Addition of 3.08 g of 50% $H_2O_2$ This was stirred for 1 hour at approximately 25° C. The COD- and TOC-content of the effluent treated thus was then determined:
COD: 596 mg/l
TOC: 307 mg/l The treated effluent was then adjusted using milk of lime to pH value 8.0. After separating the flocculated material and the precipitated components, the effluent had the following values:
COD: 208 mg/l
TOC: 114 mg/l
$BOD_5$: 90 mg/l There was no longer a noxious effect in respect of *Pseudomonas fluorescens* and *Leuciscus idus*. This effluent was then subjected to a treatment according to the activated sludge process.

EXAMPLE 2

Effluent from the production of dichlorophenols contained the following substances among others:
100—200 mg/l of 2,4-dichlorophenol
100—200 mg/l of 2,6-dichlorophenol The COD, TOC, $BOD_5$ and pH values of the effluent were the following:
COD: 530 mg/l
TOC: 200 mg/l
$BOD_5$: 75 mg/l
pH: 0.1

The noxious effect of this effluent in respect of *Pseudomonas fluorescens* was at 1:32 up to dilution, and 1:700 in respect of *Leuciscus idus*.

The effluent characterized above was subjected to the following chemical treatment (proportions always being based on 1 l of effluent):
1. Addition of 0.307 g of $FeSO_4.7H_2O$
2. pH adjustment using milk of lime to pH value 4
3. Addition of 1.877 g of 30% $H_2O_2$ This was stirred for 2 hours at 30° C. The COD- and TOC-content of the effluent treated thus was then determined:
COD: 265 mg/l
TOC: 134 mg/l The treated effluent was then adjusted using milk of lime to pH value 7.5. After separating the flocculated material and the precipitated components, the effluent had the following values:
COD: 141 mg/l
TOC: 86 mg/l
BOD$_5$: 67 mg/l There was no longer any noxious effect in respect of *Pseudomonas fluorescens* and *Leuciscus idus*. This neutralized effluent was subjected to another subsequent treatment following the activated sludge process.

EXAMPLE 3

A mixed effluent from the range of organic productions contained, among others, from 50 to 300 mg/l each of the following compounds: chlorobenzene, o-chlorophenol, 2,4-and 2,6-dichlorophenol, 2,4,6-trichlorophenol, m-nitrophenol, N-methylaniline, N,N-diethylaniline, pyridine, α-picoline, o-nitroaniline, aniline-2-sulphonic acid, 2-aminophenol-4-sulphonic acid, 1-naphthalene sulphonic acid, 2-naphthalene sulphonic acid, H-acid, R-acid, crystal violet, methylred, anthracene-1-sulphonic acid, anthraquinone-1,5-disulphonic acid, 4,5-dichloro-anthraquinone-1,8-disulphonic acid, 5-nitro-anthraquinone-1-sulphonic acid, 1-amino-anthraquinone-2-sulphonic acid, 8-amino-anthraquinone-1-sulphonic acid, 1,5-dihydroxy-anthraquinone-2,6-disulphonic acid, 4,5-diamino-1,8-dihydroxy-anthraquinone-2,7-disulphonic acid, alkyl-phenolpolyglycolether, lauryl-sulphuric acid, 5-[(4-aminophenyl)-azo-2-hydroxybenzoic acid, 5-[(4-aminobenzoyl)-amino/phenyl]-azo]-2-hydroxybenzoic acid, 4-[(4-amino-1-naphthyl)-azo]-benzene sulphonic acid.

The COD, TOC, BOD$_5$ and pH values of the effluent were as follows:
COD: 1 357.0 mg/l
TOC: 489.0 mg/l
BOD$_5$: 173.0 mg/l
pH 3.5

The noxious effect of this effluent in respect of *Pseudomonas fluorescens* was at 1:17 up to dilution, and 1:400 in respect of *Leuciscus idus*.

The effluent characterized above was subjected to the following chemical treatment (proportions always being based on 1 l of effluent):
1. Addition of 0.959 g of FeSO$_4$.7H$_2$O
2. pH adjustment using soda lye to pH value 4.0
3. Addition of 3.5 g of 50% H$_2$O$_2$ This was stirred for 4 hours at 20° C. The COD- and TOC-content of the effluent thus treated was then determined:
COD: 533 mg/l
TOC: 294 mg/l The treated effluent was then adjusted using milk of lime to pH value 8.5. After separating the flocculated material and the precipitated components, the effluent had the following values:
COD: 325 mg/l
TOC: 189 mg/l
BOD$_5$: 150 mg/l There was no longer any noxious effect in respect of *Pseudomonas fluorescens* and *Leuciscus idus*.

This neutralized effluent was then subjected to a treatment according to the activated sludge process.

EXAMPLE 4

A mixed effluent from the production of organic intermediate products had the following COD, BOD$_5$ and pH values:

COD: 8 600 mg/l
BOD$_5$: 350 mg/l
pH: 1.5

The noxious effect of this effluent in respect of *Pseudomonas fluorescens* was at 1:64 up to dilution, and at 1:250 in respect of *Leuciscus idus*.

The effluent characterized above was subjected respectively to:
(a) a hydrogen peroxide oxidation in the presence of respectively the same quantities of iron (II)-sulphate,
(b) flocculation and precipitation using FeSO$_4$.7H$_2$O as the flocculant and
(c) a combination of the hydrogen peroxide treatment according to (a) with the subsequent flocculation and precipitation according to (b) (details always being based on 1 l of effluent)

(a) Hydrogen peroxide oxidation
1. Addition of 6.0 g of FeSO$_4$.7H$_2$O
2. pH adjustment using milk of lime to pH value 4.0
3. Addition of 21.9 g of 50% H$_2$O$_2$ This was stirred for 1 hour at approximately 25° C. The COD of the effluent thus treated was: COD 3440 mg/l (b) Flocculation and Precipitation
1. Addition of 6.0 g of FeSO$_4$.7H$_2$O
2. Stirring for 15 minutes at approximately 25° C.
3. Neutralization using milk of lime to pH value 7.5
4. Separating the sediment and adjusting the same using milk of lime to pH value 11
5. Filtration The COD of the combined filtrates was: COD 7131 mg/l (c) Combination of the invention of the hydrogen peroxide treatment and the flocculation and precipitation process
1. Addition of 6.0 g of FeSO$_4$.7H$_2$O
2. pH adjustment using milk of lime pH value 4.0
3. Addition of 21.9 g of 50% H$_2$O$_2$
4. Stirring for 60 minutes at approximately 25° C.
5. Neutralisation using milk of lime to pH value 7.5
6. Separating the sediment and adjusting the same using milk of lime to pH value 11
7. Filtration The COD of the combined filtrates was: COD: 1598 mg/l

EXAMPLE 5

A mixed effluent from the production of organic intermediate products had the following COD, BOD$_5$ and pH values:
COD: 89 000 mg/l
BOD$_5$: 3 650 mg/l
pH: 0.1

The noxious effect of this effluent in respect of *Pseudomonas fluorescens* was at 1:140 up to dilution, and at 1:350 in respect of *Leuciscus idus*.

The effluent characterized above was subjected respectively to:
(a) a hydrogen peroxide oxidation in the presence of respectively the same quantities of iron (II) sulphate,
(b) a flocculation and precipitation using FeSO$_4$.7H$_2$O as the flocculant and
(c) a combination of the hydrogen peroxide treatment according to (a) with the subsequent flocculation and precipitation according to (b) (proportions always being based on 1 l of effluent.
(a) Hydrogen peroxide oxidation 1. Addition of 56.7 g of FeSO$_4$.7H$_2$O
2. pH adjustment using milk of lime to pH value 4.0
3. Addition of 209.0 g of 50% H$_2$O$_2$ This was stirred for 1 hour at approximately 25° C.
The COD of the effluent thus treated was: COD: 39 827 mg/l (b) Flocculation and Precipitation
1. Addition of 56.7 g of FeSO$_4$.7H$_2$O
2. Stirring for 15 minutes at approximately 25° C.
3. Neutralization using milk of lime to pH value 7.5
4. Separating the sediment and adjusting the same using milk of lime to pH value 11
5. Filtration The COD of the combined filtrates was: COD: 67 234 mg/l (c) Combination of the invention of the hydrogen peroxide treatment and the flocculation and precipitation process
1. Addition of 56.7 of FeSO$_4$.7H$_2$O
2. pH adjustment using milk of lime to pH value 4.0
3. Addition of 209.0 g of 50% H$_2$O$_2$
4. Stirring for 60 minutes at approximately 25° C.
5. Neutralization using milk of lime to pH value 7.5
6. Separating the sediment and adjusting the same using milk of lime to pH value 11
7. Filtration The COD of the combined filtrates was: COD: 9 670 mg/l It will be appreciated that the instant specification and examples are set forth by way of illustration and not limitation, and that various modifications and changes may be made without departing from the spirit and scope of the present invention.

We claim:

1. In the process for decreasing the COD-content of effluent by treating with hydrogen peroxide in the presence of a transition metal compound, the improvement which comprises bringing the pH of the effluent to from about 4 to 5, adding to the effluent about 55 to 63% of the calculated quantity of H$_2$O$_2$ required for the total oxidation of the total COD-content of the effluent, the transition metal comprising iron and being dissolved in the effluent in an amount such that the molar ratio of H$_2$O$_2$ to iron is from about 20:1 to 10:1, maintaining the effluent at about 5° to 100° C., adding a base to the effluent to adjust the pH to approximately neutral, separating from the effluent whatever material has flocculated, and thereafter subjecting the effluent to biological degradation.

2. A process according to claim 1, wherein about 57 to 62% of the calculated quantity of H$_2$O$_2$ required for the total oxidation of the total COD-content of the effluent is added to the effluent.

3. A process according to claim 1, wherein the transition metal compound is present in an amount such that the molar ratio of the hydrogen peroxide to the transition metal compound in the effluent is from about 18:1 to 13:1.

* * * * *